United States Patent
D'Agostini et al.

(10) Patent No.: US 9,513,002 B2
(45) Date of Patent: Dec. 6, 2016

(54) WIDE-FLAME, OXY-SOLID FUEL BURNER

(71) Applicant: AIR PRODUCTS AND CHEMICALS, INC., Allentown, PA (US)

(72) Inventors: Mark Daniel D'Agostini, Allentown, PA (US); Stephane Bernard Poussou, Jacksonville, FL (US)

(73) Assignee: Air Products and Chemicals, Inc., Allentown, PA (US)

( * ) Notice: Subject to any disclaimer, the term of this patent is extended or adjusted under 35 U.S.C. 154(b) by 441 days.

(21) Appl. No.: 14/224,696

(22) Filed: Mar. 25, 2014

(65) Prior Publication Data

US 2014/0305356 A1 Oct. 16, 2014

Related U.S. Application Data

(60) Provisional application No. 61/811,194, filed on Apr. 12, 2013.

(51) Int. Cl.
   *F23D 1/00* (2006.01)
   *F23L 7/00* (2006.01)

(52) U.S. Cl.
   CPC ............... *F23L 7/007* (2013.01); *F23D 1/00* (2013.01); *F23D 2201/10* (2013.01); *F23D 2201/20* (2013.01); *Y02E 20/344* (2013.01)

(58) Field of Classification Search
   CPC ............. F23D 1/00; F23D 1/005; F23D 1/04; F23D 1/06; F23D 2201/00; F23D 2201/10; F23D 2201/101; F23D 2201/20; F23D 2201/30

(Continued)

(56) References Cited

U.S. PATENT DOCUMENTS 3,823,875 A * 7/1974 Bauer ....................... F23D 1/00
                                                        239/419.5
3,894,834 A    7/1975 Estes
(Continued)

FOREIGN PATENT DOCUMENTS

CN    1098489 A    2/1995
CN    1551964 A    12/2004
(Continued)

OTHER PUBLICATIONS

Howard, J. H. G., "Performance and Flow Regimes for Annular Diffusers", The American Society of Mechanical Engineers, an ASME publication, pp. 1-11.

(Continued)

*Primary Examiner* — David J Laux
(74) *Attorney, Agent, or Firm* — Larry S. Zelson

(57) ABSTRACT

A wide-flame solid fuel/oxygen burner including a fuel nozzle having an aspect ratio of at least about 2 defined by the ratio of a fuel nozzle width, W, measured along a major axis centerline, to a fuel nozzle height, H, measured along a minor axis centerline, and long walls spaced substantially symmetrically from the major axis centerline, the fuel nozzle having an inlet width, WN; and a pair of guide vanes positioned on either side of the major axis centerline between that centerline and an adjacent long wall, the guide vanes diverging from the major axis centerline in the flow direction by an angle such that the guide vanes are closer together at an upstream end and farther apart at a downstream end, thereby forming a central diffuser between the guide vanes and an outer converging nozzle between each guide vane and one of the long walls.

12 Claims, 18 Drawing Sheets

(58) Field of Classification Search
USPC .................................................. 110/104 B
See application file for complete search history.

(56) References Cited

U.S. PATENT DOCUMENTS

| | | | | |
|---|---|---|---|---|
| 4,634,054 | A * | 1/1987 | Grusha | F23C 5/06 |
| | | | | 239/423 |
| 4,928,605 | A | 5/1990 | Suwa et al. | |
| 5,611,682 | A | 3/1997 | Slavejkov et al. | |
| 5,685,242 | A | 11/1997 | Narato et al. | |
| 5,937,770 | A | 8/1999 | Kobayashi et al. | |
| 6,089,171 | A * | 7/2000 | Fong | F23C 5/06 |
| | | | | 110/104 B |
| 6,113,389 | A | 9/2000 | Joshi et al. | |
| 6,116,171 | A | 9/2000 | Oota et al. | |
| 6,145,449 | A * | 11/2000 | Kaneko | F23C 5/06 |
| | | | | 110/261 |
| 6,367,394 | B1 | 4/2002 | Kaneko et al. | |
| 6,439,136 | B1 * | 8/2002 | Mann | F23D 1/00 |
| | | | | 110/263 |
| 6,752,620 | B2 | 6/2004 | Heier et al. | |
| 6,843,185 | B1 | 1/2005 | Taylor | |
| 7,390,189 | B2 | 6/2008 | D'Agostini | |
| 7,717,701 | B2 | 5/2010 | D'Agostini et al. | |
| 9,127,836 | B2 * | 9/2015 | Matsumoto | F23D 1/00 |
| 2003/0075843 | A1 | 4/2003 | Wunsche | |
| 2004/0211345 | A1 | 10/2004 | Okazaki et al. | |
| 2006/0057517 | A1 | 3/2006 | Joshi et al. | |
| 2008/0184919 | A1 | 8/2008 | D'Agostini et al. | |
| 2009/0277364 | A1 * | 11/2009 | Donais | F23C 7/008 |
| | | | | 110/263 |
| 2010/0018445 | A1 | 1/2010 | Li et al. | |
| 2010/0154689 | A1 | 6/2010 | Adam et al. | |
| 2012/0210917 | A1 | 8/2012 | Belasse et al. | |
| 2014/0305356 | A1 | 10/2014 | D'Agostini et al. | |

FOREIGN PATENT DOCUMENTS

| | | |
|---|---|---|
| CN | 202284791 | 6/2012 |
| CN | 102679338 A | 9/2012 |
| CN | 204026656 U | 12/2014 |
| JP | 2000356309 A | 12/2000 |
| JP | 2005024136 A2 | 1/2005 |
| KR | 10-0201677 | 6/1999 |
| KR | 200000023593 A | 4/2000 |
| KR | 20030040183 | 5/2003 |
| TW | 313247 A | 11/1997 |
| WO | 2013097165 A1 | 7/2013 |

OTHER PUBLICATIONS

Rao, D. M., "A Method of Flow Stabilisation with High Pressure Recovery in Short, Conical Diffusers", Technical Notes, The Aeronautical Journal of the Royal Aeronautical Society, May 1971, vol. 75, pp. 330, 337-339.

Rao, Dhanvada M., "Application of Radial-Splitters for Improved Wide-Angle Diffuser Performance in Blowdown Tunnel", National Aeronautical Laboratory, Bangalore, India, J. Aircraft, vol. 13, No. 7, pp. 538-540.

Reneau, L. R., "Performance and Design of Straight, Two-Dimensional Diffusers", Journal of Basic Engineering, Mar. 1967, pp. 141-150.

\* cited by examiner

WIDE-FLAME, OXY-SOLID FUEL BURNER

BACKGROUND

This application relates to a flat flame burner for combusting solid fuel with oxygen.

Due to their very low volatile matter content, solids fuel such as petroleum coke (petcoke) and anthracite coal, among others, are very difficult fuel to ignite in a flowing stream. Hence, the solid fuel typically undergoes a significant ignition delay that results in a flame front which is substantially detached from the fuel nozzle. This is an inherently unstable situation that can lead to high levels of unburned carbon, unstable process heating conditions (heat transfer, melting, etc.) and, potentially, blow-off of the flame that can lead to a very rapid and unsafe degradation in combustion.

U.S. Pat. No. 7,390,189, which is incorporated herein by reference in its entirety, describes a flat-flame or wide-flame burner configured for combustion of gaseous fuels. However, that burner is not configured to operate with a pulverized solid fuel, and specifically lacks any internal geometric features in both the fuel and oxygen nozzles that might be necessary to enable the burner to combustion solid fuel in a stable, attached flame.

SUMMARY

Described herein is a flat flame burner configured to combust solid fuel, including but not limited to petcoke, with oxygen for glass melting. The present burner provides for formation of a stable solid fuel flame front that is attached to the burner face (i.e., fuel nozzle tip), a condition that results in desirable heat transfer, carbon burnout, and flame stability.

Pulverized solid fuel and a transport gas are introduced into the fuel intake and flow through a fuel nozzle. The fuel mixture is fed through an array of one or more static flow elements which includes guide vanes to create a combination diffuser/converging nozzle, and may also include a flow segregator. The flow segregator acts to increase the concentration of fuel in the mixture delivered to a central diffuser defined by the guide vanes, while simultaneously reducing the concentration of fuel in the remainder of the flow stream that is conveyed outside the central diffuser in converging nozzles on the opposite side of the guide vanes. Divergence of the guide vanes in the diffuser lowers the velocity of a concentrated fraction of the solid fuel stream in a controlled manner without appreciable flow separation. A diluted fraction of the solid fuel stream flowing outside the guide vanes is accelerated in converging nozzles on either side of the diffuser to a relatively high velocity. The combination of relatively high velocity and low velocity streams flowing adjacent to one another creates a large flow recirculation pattern that substantially aids in sustaining stable combustion at the fuel nozzle tip.

Primary oxygen is introduced in an annulus that surrounds the fuel nozzle at the burner tip. The primary oxygen may be accelerated over wedges that divert the primary oxygen away from the fuel stream, creating a recirculation zone adjacent the fuel stream that further assists in achieving stable combustion.

Aspect 1: A wide-flame solid fuel/oxygen burner comprising: a fuel nozzle having an upstream-to-downstream flow direction, an aspect ratio of at least about 2 defined by the ratio of a fuel nozzle width, W, measured along a major axis centerline, to a fuel nozzle height, H, measured along a minor axis centerline, and long walls spaced substantially symmetrically from the major axis centerline, the fuel nozzle having an inlet width, WN; and a pair of first guide vanes positioned on either side of the major axis centerline of the fuel nozzle, each first guide vane being positioned between the major axis centerline and an adjacent one of the long walls, the first guide vanes diverging from the major axis centerline in the flow direction by a first angle such that the first guide vanes are closer together at an upstream end and farther apart at a downstream end, thereby forming a central diffuser between the first guide vanes and an outer converging nozzle between each first guide vane and one of the long walls.

Aspect 2: The burner of Aspect 1, wherein the first guide vanes are positioned asymmetrically with respect to the major axis centerline.

Aspect 3: The burner of Aspect 1, wherein the first guide vanes are positioned substantially symmetrically with respect to the major axis centerline.

Aspect 4: The burner of Aspect 3, further comprising: at least one second guide vane positioned between the pair of first guide vanes, the second guide vane diverging from each of the first guide vanes, thereby forming an additional diffusing passage for each of the at least one second guide vane.

Aspect 5: The burner of Aspect 4, wherein two second guide vanes are positioned substantially symmetrically on either side of the major axis centerline of the fuel nozzle, the second guide vanes diverging from the major axis centerline by a second angle less than the first angle, thereby forming a primary central diffuser between the second guide vanes and a secondary central diffuser between each second guide vane and one of the first guide vanes.

Aspect 6: The burner of any of Aspects 1 to 5, wherein each of the first guide vanes further includes a leading edge oriented substantially parallel to the major centerline axis of the fuel nozzle.

Aspect 7: The burner of any of Aspects 1 to 6, wherein each central diffuser has a geometry configured to produce a non-separating flow.

Aspect 8: The burner of any of Aspects 1 to 7, wherein the upstream ends of the first guide vanes are spaced apart by a distance, W1, from about 0.15 to about 0.60 times the fuel nozzle inlet width, WN.

Aspect 9: The burner of Aspect 8, wherein the distance between the upstream ends of the first guide vanes, W1, is from about 0.20 to about 0.40 times the fuel nozzle inlet width, WN.

Aspect 10: The burner of any of Aspects 1 to 9, wherein the downstream ends of the first guide vanes are spaced apart by a distance, W2, from about 1.3 to about 4.0 times the distance between the upstream ends of the first guide vanes, W1.

Aspect 11: The burner of Aspect 10, wherein the distance between the downstream ends of the first guide vanes, W2, is from about 1.7 to about 3.0 times the distance between the upstream ends of the first guide vanes, W1.

Aspect 12: The burner of any of Aspects 1 to 11, wherein the downstream end of each one of the first guide vanes and the adjacent one of the long walls with which an outer converging nozzle is formed are spaced apart by a distance, W4, from about 0.15 to about 0.75 times a distance between the upstream end of the one of the first guide vanes and the one long wall, W3.

Aspect 13: The burner of Aspect 12, wherein the distance between the downstream end of each one of the first guide vanes and the adjacent one of the long walls with which an outer converging nozzle is formed, W4, is from about 0.25 to about 0.60 times the distance between the upstream end of the one of the first guide vanes and the one long wall, W3.

Aspect 14: The burner of any of Aspects 1 to 13, further comprising: at least one flow segregator positioned in the fuel nozzle upstream of and spaced apart from each of the first guide vanes; wherein each flow segregator comprises an upstream apex; and wherein the apex of the flow segregator is positioned at a distance, Xm, from the major axis centerline greater than a distance between the upstream end of the first guide vane and the major axis centerline, Xv.

Aspect 15: The burner of Aspect 14, wherein each flow segregator further comprises an inner side extending downstream and toward the major axis centerline with respect to the apex.

Aspect 16: The burner of Aspect 15, wherein an angle, α, defined between the inner side and the major axis centerline, is from about 0° and about 90°.

Aspect 17: The burner of Aspect 16, wherein the angle, α is from about 15° to about 45°.

Aspect 18: The burner of any of Aspects 15 to 17, wherein the inner side is a straight inner side, the flow segregator further comprising a straight outer side extending downstream and away from the major axis centerline with respect to the apex, and a curved rear side joining a downstream end of the inner side to a downstream end of the outer side.

Aspect 19: The burner of any of Aspects 15 to 17, wherein the flow segregator has an oval shape and the apex is positioned at a vertex of the major axis of the oval.

Aspect 20: The burner of any of Aspects 15 to 17, wherein the inner side is a straight inner side, the flow segregator further comprising a straight outer side extending downstream and toward the major axis substantially parallel to the straight inner side.

Aspect 21: The burner of any of Aspects 15 to 17, wherein the flow segregator has a substantially triangular shape, wherein the inner side is a straight inner side, the flow segregator further comprising a straight outer side diverging from the straight inner side in a downstream direction, and a straight rear side joining a downstream end of the inner side to a downstream end of the outer side.

Aspect 22: The burner of any of Aspects 1 to 21, further comprising: a primary oxygen conduit adjacent to each of the long walls of the fuel nozzle; and a wedge protruding from each of the long walls into the oxygen conduit at a downstream end of the fuel nozzle, the wedge being positioned to cause primary oxygen flow to diverge outwardly from the major axis centerline of the fuel nozzle.

Aspect 23: The burner of Aspect 22, wherein the wedge is generally triangular in shape and has a divergent angle from about 3° to about 30°.

Aspect 24: The burner of Aspect 22, wherein the wedge has a concave surface adjacent to the primary oxygen flow.

Aspect 25: The burner of Aspect 24, further comprising a secondary oxygen conduit spaced apart from one of the primary oxygen conduits and further distance from the fuel stream than the one of the primary oxygen conduits.

Aspect 26: A wide-flame solid fuel/oxygen burner comprising: a fuel nozzle having an upstream-to-downstream flow direction, an aspect ratio of at least about 2 defined by the ratio of a fuel nozzle width, W, measured along a major axis centerline, to a fuel nozzle height, H, measured along a minor axis centerline, and long walls spaced substantially symmetrically from the major axis centerline; and a pair of first guide vanes positioned substantially symmetrically on either side of the major axis centerline of the fuel nozzle, each first guide vane being positioned between the major axis centerline and an adjacent one of the long walls, the first guide vanes diverging from the major axis centerline in the flow direction by a first angle such that the first guide vanes are closer together at an upstream end and farther apart at a downstream end, thereby forming a central diffuser between the first guide vanes and an outer converging nozzle between each first guide vane and one of the long walls; wherein the upstream ends of the first guide vanes are spaced apart by a distance, W1, from about 0.15 to about 0.60 times the fuel nozzle inlet width, WN; wherein the downstream ends of the first guide vanes are spaced apart by a distance, W2, from about 1.3 to about 4.0 times the distance between the upstream ends of the first guide vanes, W1; and wherein the downstream end of each one of the first guide vanes and the adjacent one of the long walls with which an outer converging nozzle is formed are spaced apart by a distance, W4, from about 0.15 to about 0.75 times a distance between the upstream end of the one of the first guide vanes and the one long wall, W3.

Aspect 27: The burner of Aspect 26, further comprising: at least one second guide vane positioned between the first pair of guide vanes, the second guide vane diverging from each of the first guide vanes, thereby forming an additional diffusing passage for each of the at least one second guide vane.

Aspect 28: The burner of Aspect 27, wherein two second guide vanes are positioned substantially symmetrically on either side of the major axis centerline of the fuel nozzle, the second guide vanes diverging from the major axis centerline by a second angle less than the first angle, thereby forming a primary central diffuser between the second guide vanes and a secondary central diffuser between each second guide vane and one of the first guide vanes.

Aspect 29: The burner of any of Aspects 26 to 28, wherein each of the first guide vanes further includes a leading edge oriented substantially parallel to the major centerline axis of the fuel nozzle.

Aspect 30: The burner of any of Aspects 26 to 29, further comprising: a flow segregator positioned in the fuel nozzle upstream of and spaced apart from each of the first guide vanes; wherein each flow segregator comprises an upstream apex and an inner side extending downstream and toward the major axis centerline with respect to the apex; and wherein the apex of the flow segregator is positioned at a distance, Xm, from the major axis centerline greater than a distance between the upstream end of the first guide vane and the major axis centerline, Xv, and wherein $Xv=\frac{1}{2}(W1)$.

Aspect 31: The burner of Aspect 30, wherein an angle, α, defined between the inner side and the major axis centerline, is from about 15° and about 45°.

Aspect 32: The burner of any of Aspects 26 to 31, further comprising: a primary oxygen conduit adjacent to each of the long walls of the fuel nozzle; a wedge protruding from each of the long walls into the oxygen conduit at a downstream end of the fuel nozzle, the wedge being positioned to cause primary oxygen flow to diverge outwardly from the major axis centerline of the fuel nozzle; wherein the wedge is generally triangular in shape and has a divergent angle from about 3° to about 30°.

Aspect 33: The burner of Aspect 32, further comprising a secondary oxygen conduit spaced apart from one of the primary oxygen conduits and further distance from the fuel stream than the one of the primary oxygen conduits.

Aspect 34: A wide-flame solid fuel/oxygen burner comprising: a fuel nozzle having an upstream-to-downstream flow direction, an aspect ratio of at least about 2 defined by the ratio of a fuel nozzle width, W, measured along a major axis centerline, to a fuel nozzle height, H, measured along a minor axis centerline, and long walls spaced substantially symmetrically from the major axis centerline; and a pair of first guide vanes positioned substantially symmetrically on either side of the major axis centerline of the fuel nozzle, each first guide vane being positioned between the major axis centerline and an adjacent one of the long walls, the first guide vanes diverging from the major axis centerline in the flow direction by a first angle such that the first guide vanes are closer together at an upstream end and farther apart at a downstream end, thereby forming a central diffuser between the first guide vanes and an outer converging nozzle between each first guide vane and one of the long walls; a flow segregator positioned in the fuel nozzle upstream of and spaced apart from each of the first guide vanes; wherein each flow segregator comprises an upstream apex and an inner side extending downstream and toward the major axis centerline with respect to the apex; and wherein the apex of the flow segregator is positioned at a distance, Xm, from the major axis centerline greater than a distance between the upstream end of the first guide vane and the major axis centerline, Xv.

Aspect 35: The burner of Aspect 34, further comprising: at least one second guide vane positioned between the first pair of guide vanes, the second guide vane diverging from each of the first guide vanes, thereby forming an additional diffusing passage for each of the at least one second guide vane.

Aspect 36: The burner of Aspect 35, wherein two second guide vanes are positioned substantially symmetrically on either side of the major axis centerline of the fuel nozzle, the second guide vanes diverging from the major axis centerline by a second angle less than the first angle, thereby forming a primary central diffuser between the second guide vanes and a secondary central diffuser between each second guide vane and one of the first guide vanes.

Aspect 37: The burner of any of Aspects 34 to 36, wherein each of the first guide vanes further includes a leading edge oriented substantially parallel to the major centerline axis of the fuel nozzle.

Aspect 38: The burner of Aspect 37, wherein an angle, a, defined between the inner side of the flow segregator and the major axis centerline, is from about 15° and about 45°.

Aspect 39: The burner of any of Aspects 34 to 38, wherein the upstream ends of the first guide vanes are spaced apart by a distance, W1, from about 0.15 to about 0.60 times the fuel nozzle height, H; wherein the downstream ends of the first guide vanes are spaced apart by a distance, W2, from about 1.3 to about 4.0 times the distance between the upstream ends of the first guide vanes, W1; wherein the downstream end of each one of the first guide vanes and the adjacent one of the long walls with which an outer converging nozzle is formed are spaced apart by a distance, W4, from about 0.15 to about 0.75 times a distance between the upstream end of the one of the first guide vanes and the one long wall, W3.

Aspect 40: The burner of any of Aspects 34 to 39, further comprising: a primary oxygen conduit adjacent to each of the long walls of the fuel nozzle; a wedge protruding from each of the long walls into the oxygen conduit at a downstream end of the fuel nozzle, the wedge being positioned to cause primary oxygen flow to diverge outwardly from the major axis centerline of the fuel nozzle; wherein the wedge is generally triangular in shape and has a divergent angle from about 3° to about 30°.

Aspect 41: The burner of Aspect 40, further comprising a secondary oxygen conduit spaced apart from one of the primary oxygen conduits and further distance from the fuel stream than the one of the primary oxygen conduits.

Aspect 42: A method of combusting a pulverized solid fuel with oxygen to form a wide flame, the method comprising: flowing a fuel stream of pulverized solid fuel in a transport gas through a fuel nozzle; dividing the fuel stream into at least three separate streams including a central stream flowing in a diffuser formed between a pair of first diverging guide vanes and a pair of outer streams each flowing in a converging nozzle formed between one of the guide vanes and a wall of the fuel nozzle; wherein the central stream decelerates and the outer streams accelerate.

Aspect 43: The method of Aspect 42, further comprising: after the central stream flows into the diffuser, further dividing the central stream into multiple separate diffusing streams formed by one or more second guide vanes positioned between the pair of first diverging guide vanes.

Aspect 44: The method of Aspect 42 or 43, further comprising: before the fuel stream is divided, flow the fuel stream over a pair of flow segregators, each flow segregator being positioned upstream of and spaced apart from each of the first guide vanes; wherein each flow segregator includes an upstream apex and an inner side extending downstream and toward the major axis centerline with respect to the apex; and wherein the apex is positioned at a distance, Xm, from the major axis centerline greater than a distance between the upstream end of the first guide vane and the major axis centerline, Xv.

Aspect 45: The method of any of Aspects 42 to 44, further comprising: flowing primary oxygen adjacent to each of the long walls of the fuel nozzle; and flowing the primary oxygen over a wedge protruding from each of the long walls at a downstream end of the fuel nozzle to cause primary oxygen flow to diverge outwardly from the major axis centerline of the fuel nozzle.

Aspect 46: The method of Aspect 44, further comprising: flowing secondary oxygen spaced apart from the flow of primary oxygen on one side of the fuel nozzle.

The various aspects of the system disclosed herein can be used alone or in combinations with each other.

DETAILED DESCRIPTION

For the purposes of the description herein, the following definitions are provided. Transport gas is a gaseous fluid used to carry or transport solid fuel particles, and may comprise air, oxygen-enriched air, nitrogen, carbon dioxide, recycled flue gas, and combinations thereof. Oxygen is a gas containing oxygen molecules at a concentration greater than or equal to 28 mol % O2, preferably greater than or equal to 60 mol % O2, and more preferably greater than or equal to 85 mol % O2. Solid fuel is a hydrocarbon fuel in solid form and may comprise petroleum coke; all varieties of coal including anthracite, bituminous, sub-bituminous, and lignite; peat, wood, grass, and other so-called biomass materials; municipal solid waste; and combinations thereof.

Figure 1:
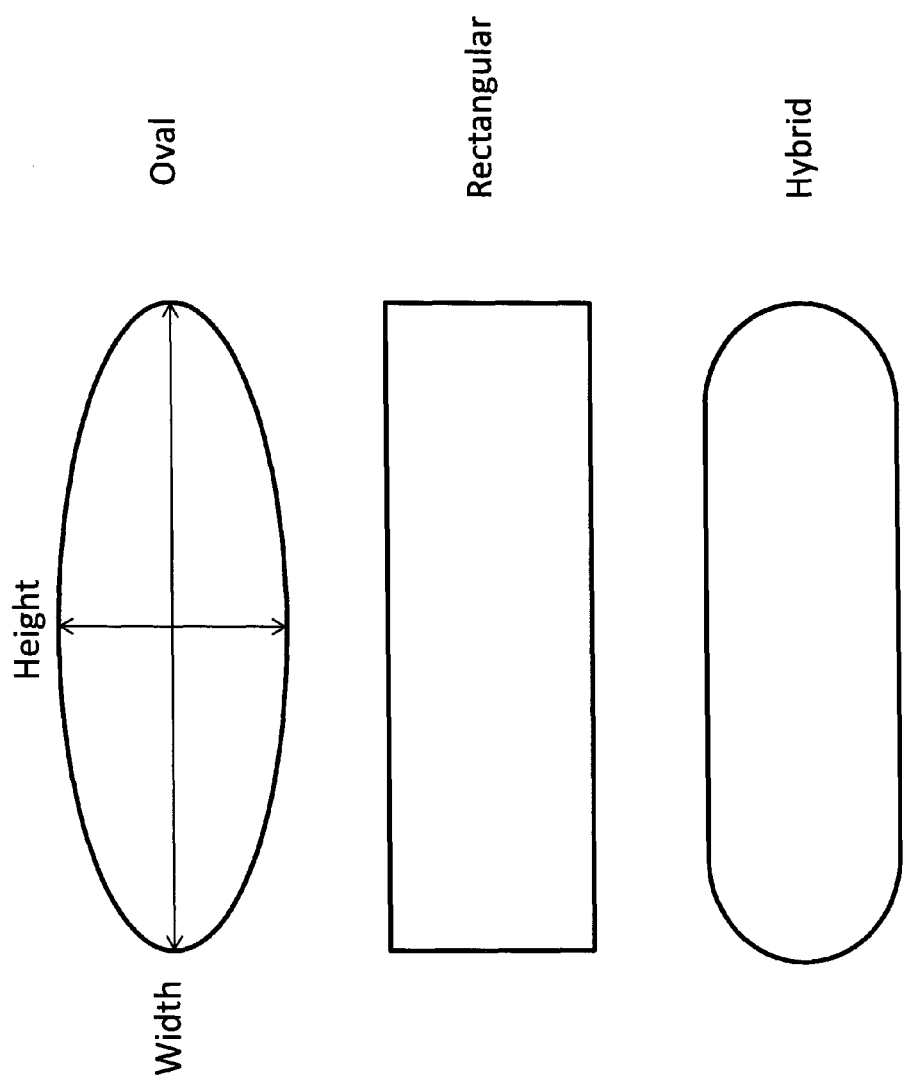
FIG. 1 is a schematic cross-sectional or end view of three possible non-limiting examples of shapes for an wide-flame fuel conduit or nozzle, including an oval shape, a rectangular shape, and a hybrid (ovalized, rectangular with rounded corners) shape; for a solid-fuel burner, the fuel nozzle carries solid fuel particles in a transport gas.

Several embodiments and variations of a flat-flame or wide-flame oxygen/pulverized solid fuel burner are described herein. A flat-flame or wide-flame burner is a burner in which the fuel nozzle has a non-circular cross-section that has an aspect ratio (i.e., width to height, or major axis to minor axis) greater than or equal to about 2. There are essentially limitless fuel nozzle cross-sectional shapes that can produce a flat or wide flame, and all are capable of functioning in accordance with the description herein. These include, but are not limited to, common fuel nozzle shapes having oval, rectangular, and hybrid (i.e., rectangular with semi-circular ends) cross-sections illustrated in FIG. 1.

Figure 2:
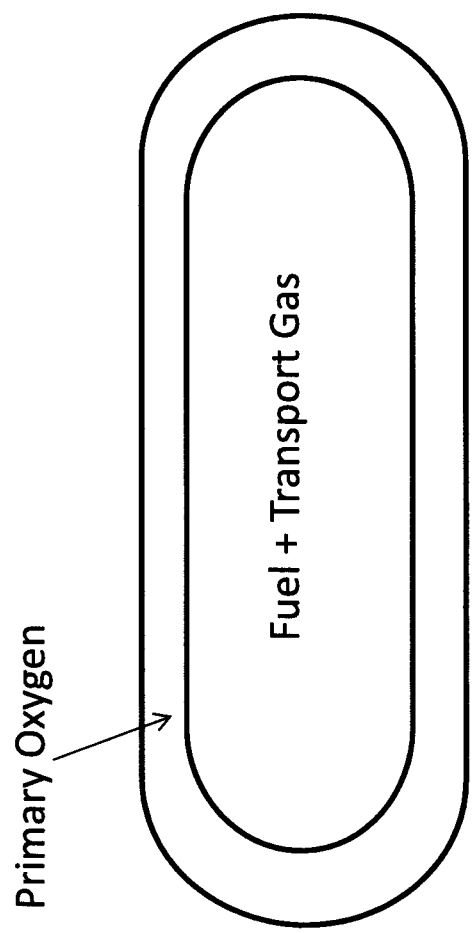
FIG. 2 is a schematic cross-sectional or end view of an exemplary wide-flame burner in which a primary oxygen conduit surrounds a fuel conduit.
Figure 3:
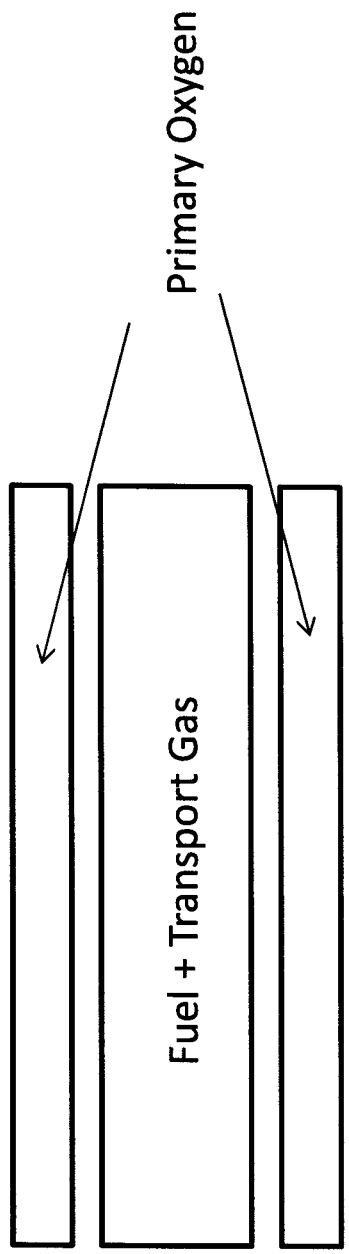
FIG. 3 is a schematic cross-sectional or end view of an exemplary wide-flame burner in which primary oxidant conduits are positioned on each long side of a fuel conduit and extend substantially parallel to a major axis of the fuel conduit.

Embodiments of the burner also include a primary oxygen stream that runs adjacent to the fuel nozzle. Two configurations of primary oxygen conduit configuration are most typical and fall within the scope of the present disclosure. In the first configuration, the oxygen conduit completely surrounds the fuel conduit as for example in FIG. 2 (i.e., the primary oxygen nozzle forms essentially an annulus around the fuel nozzle). In the second configuration, there are two primary oxygen conduits, one each adjacent the top and bottom edges of the fuel nozzle, positioned substantially parallel to the major axis of the fuel nozzle, as in FIG. 3. Various other primary oxygen nozzle configurations are possible. Each fuel nozzle is characterized by a width, W, measured along the major axis centerline, and a height, H, measured along the minor axis centerline; as noted above, ratio of W to H is at least about 2.

The burner can be configured to include one or more distinct features, each of which impacts the performance of the burner. When used in combination, two or more such features work harmoniously to enable stable and efficient solid fuel combustion. These features are included in aspects of both the fuel nozzle design and the oxygen nozzle design.

Figure 4:
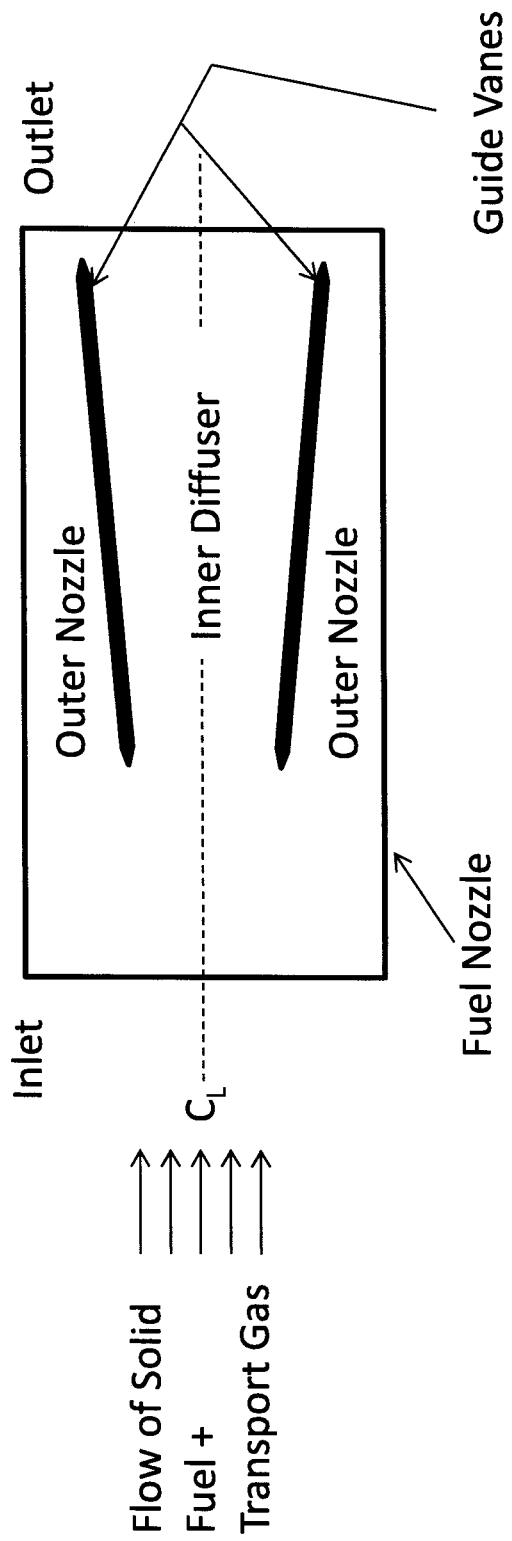
FIG. 4 is a schematic side cross-sectional view of an exemplary fuel nozzle including a pair of guide vanes that diverge in the direction of flow to form a central diffuser bounded on each side by an outer converging nozzle.
Figure 11:
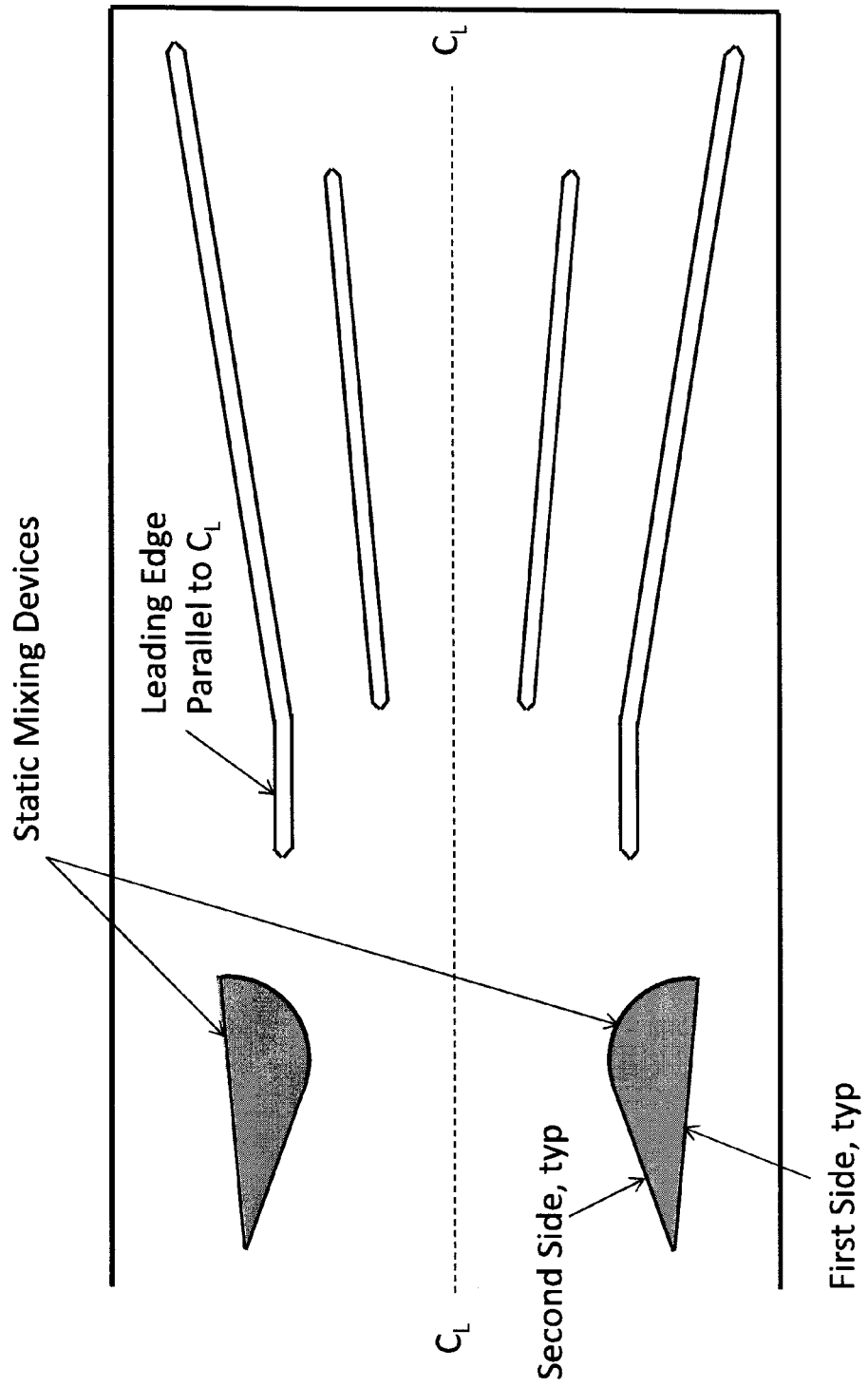
FIG. 11 is a schematic cross-sectional view of an exemplary fuel nozzle including a pair of outer guide vanes having lead edges substantially parallel to the fuel nozzle centerline and then diverging in the direction of flow, and a pair of inner diverging guide vanes positioned closer to the fuel nozzle centerline than the outer guide vanes, and further including a pair of flow segregators positioned upstream of the parallel lead edges of the outer guide vanes.

As shown in FIG. 4, one embodiment of a fuel nozzle includes two straight first or outer guide vanes symmetrically positioned about the major axis centerline of the fuel nozzle and diverging from each other in the flow direction. In other embodiments, the first guide vanes may be asymmetrically positioned with respect to the major axis centerline. The outer guide vanes have upstream ends positioned apart by a distance W1 and downstream ends positioned apart by a distance W2 greater than W1, as well as a length N as measured in the major axis direction. An alternative configuration in which the leading edge of each guide vane runs parallel to the centerline of the fuel nozzle, before diverging, is illustrated in FIG. 11. The design of FIG. 11 reduces the angle of attack of the oncoming flow and thereby minimizes the tendency toward flow separation and velocity field disruption caused by the guide vanes.

Figure 5:
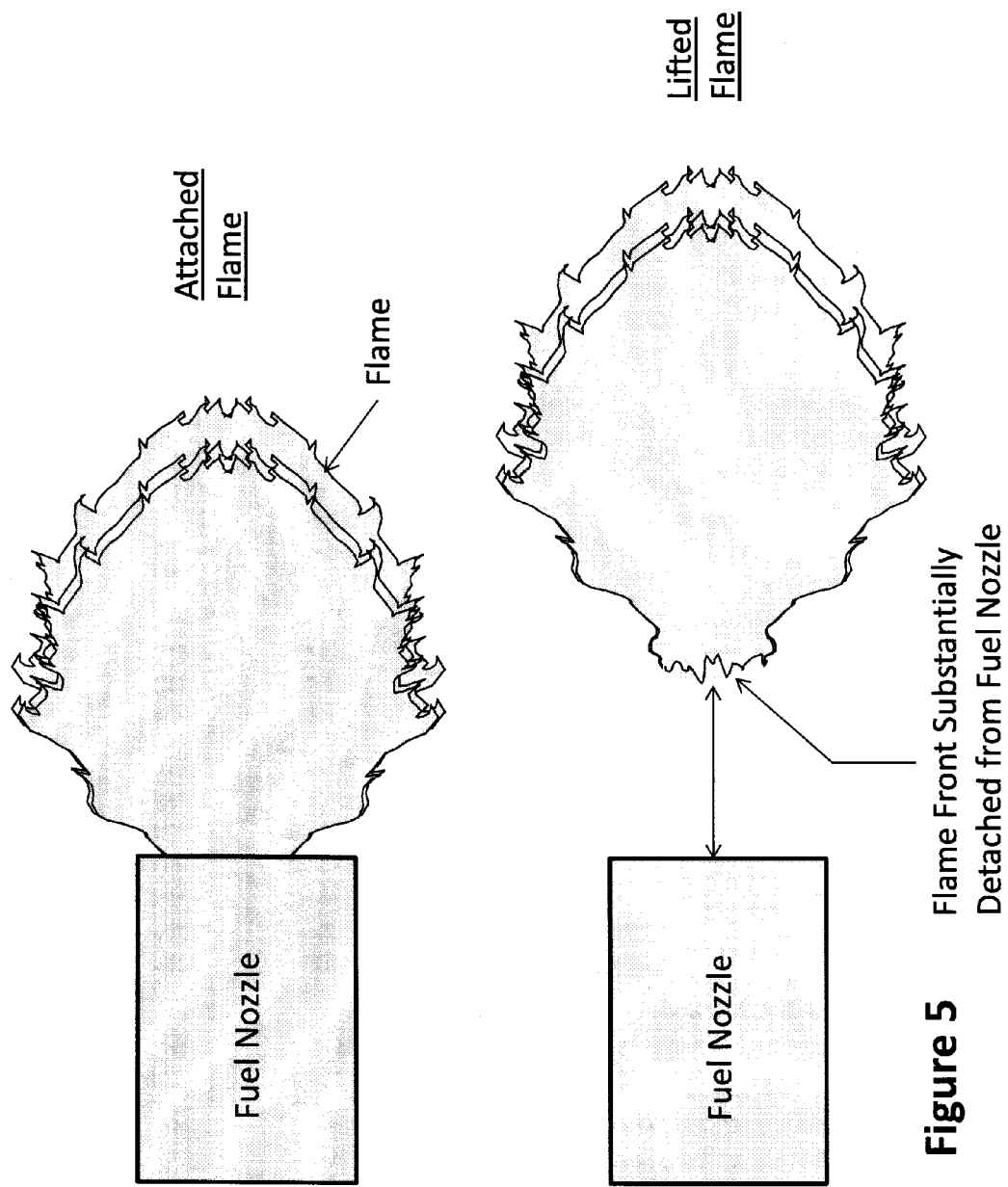
FIG. 5 is a schematic side view comparing a burner with a fuel nozzle that forms an attached flame (top) and a burner with a fuel nozzle that forms a lifted flame (bottom).

Transport gas and pulverized solid fuel are introduced into the intake of the fuel nozzle at an average velocity of nominally 15-25 m/sec. This velocity is typical for pneumatic transport in solid fuel burners since it is above the minimum conveying velocity required to prevent substantial dropout of particulate from the pneumatic mixture, while not being so high as to generate a high tendency toward erosion of nozzle hardware. Unfortunately, this same range of velocity is often too high for attaining stable attachment of a solid fuel flame, particularly when the solid fuel has a relatively low volatile matter content such as petcoke and anthracite coal, among others. Stable attachment of a flame is defined generally as the locating of the flame front immediately adjacent to the fuel nozzle tip (burner face), with little to no separation distance. Compare the top of FIG. 5, showing a stable "attached" flame, with the bottom of FIG. 5, showing a lifted or detached flame in which the flame front is considerably separated from the fuel nozzle tip. Hence, a principal goal of the present burner is to attain stable attachment of the flame front of relatively low volatile solid fuels.

Figure 6:
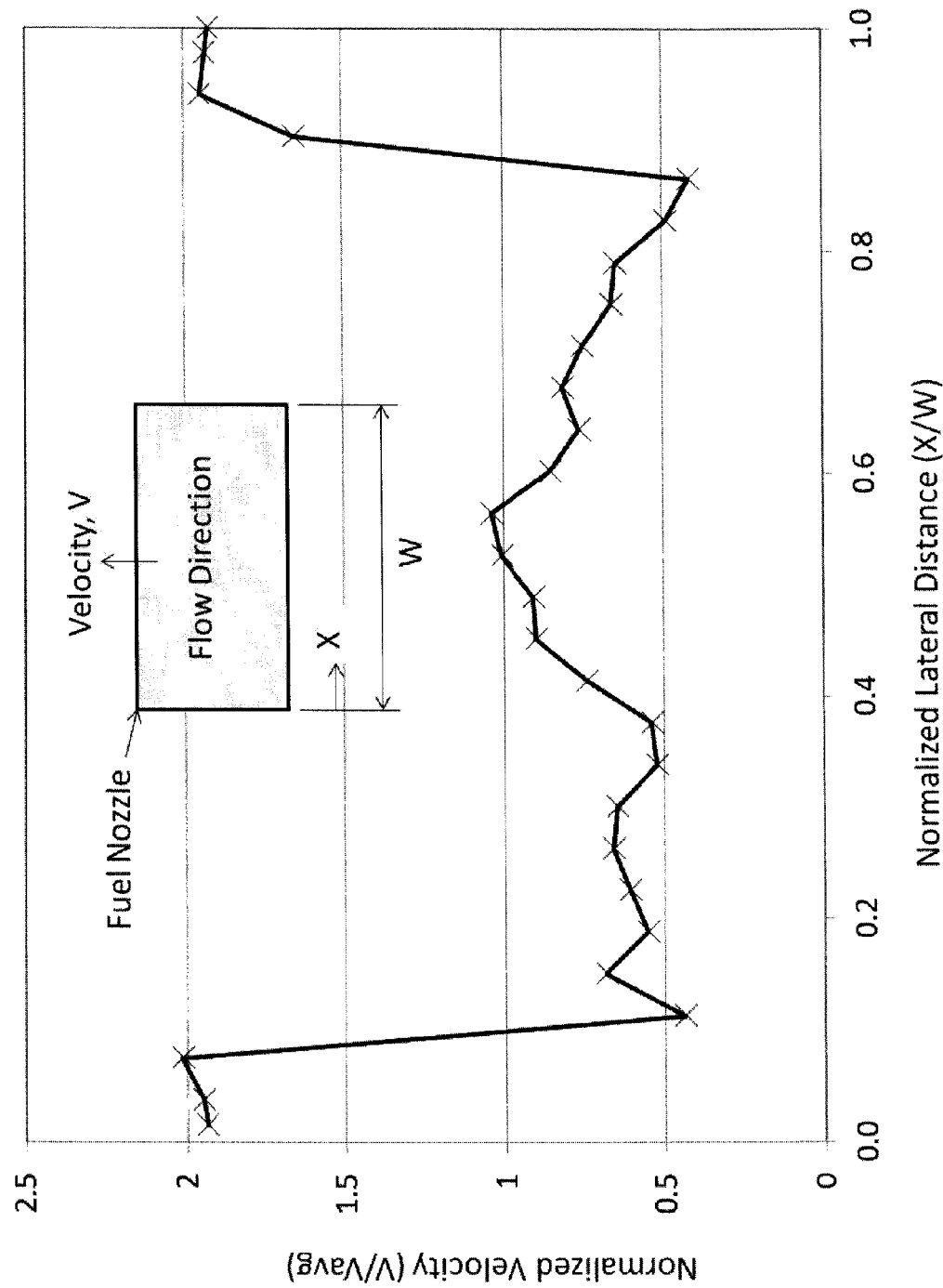
FIG. 6 is a graph showing a normalized velocity profile of the fuel stream flowing through the fuel nozzle, indicating that the flow velocity in the central diffuser is on average reduced while the flow velocity in the outer converging nozzles is on average increased.
Figure 7:
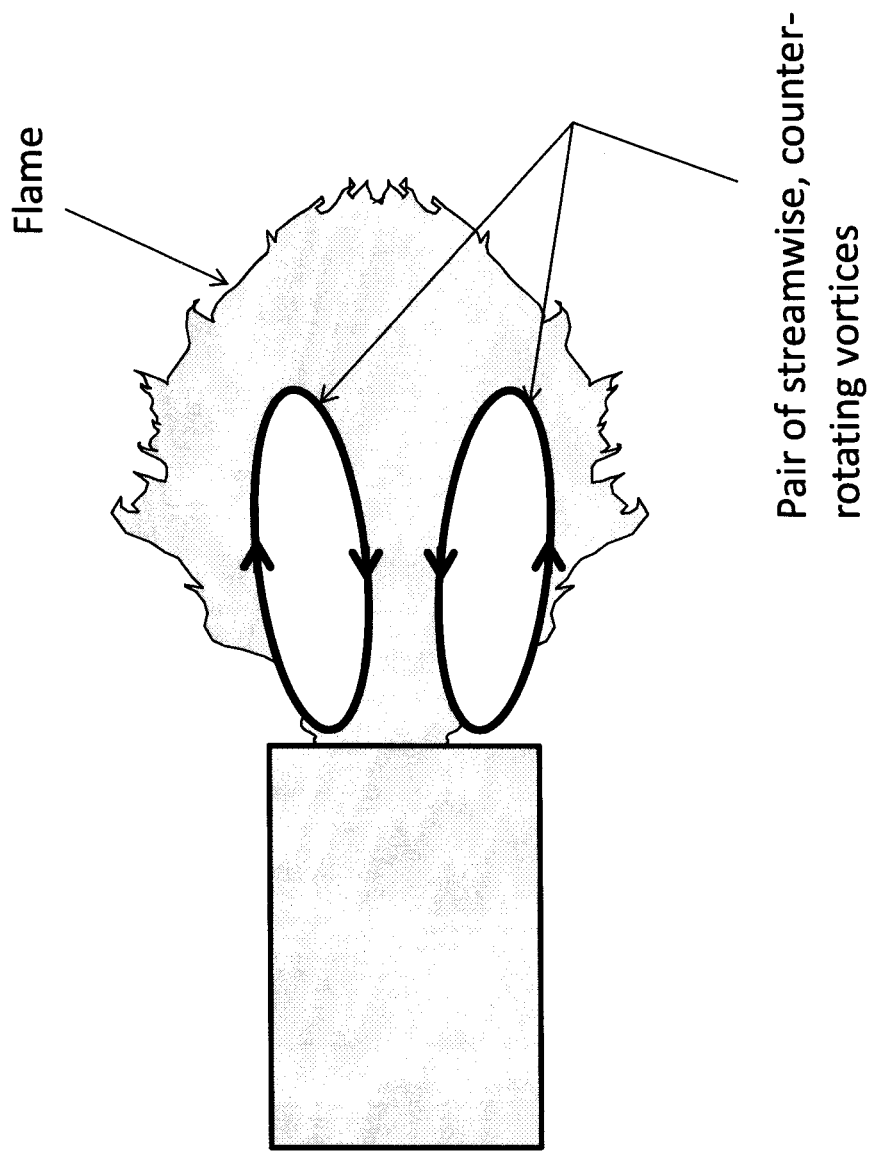
FIG. 7 is a schematic side view illustrating the formation of a pair of streamwise counter-rotating vortices formed at or slightly downstream of the outlet of the fuel nozzle as a result of the shear created between the higher velocity fuel exiting the outer converging nozzles and the lower velocity fuel exiting the central diffuser.
Figure 18:
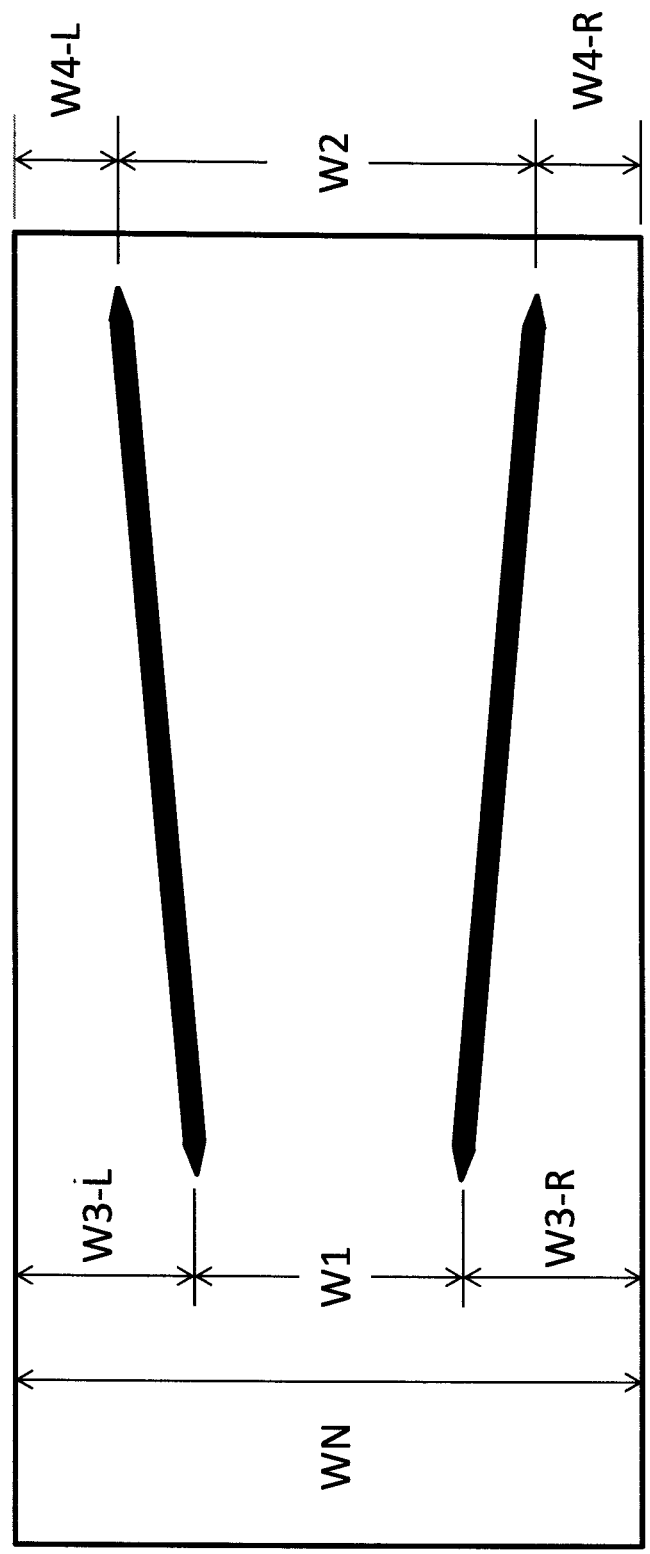
FIG. 18 is a schematic side cross-sectional view of a fuel nozzle with outer guide vanes indicating dimensional parameters.

As the solid fuel/transport gas mixture flows through the fuel nozzle of FIG. 4, it encounters the upstream ends of the first guide vanes, which separate the mixture into three distinct flow streams. In particular, a central diffusing flow stream is formed which acts to decelerate the flow, while a pair of preferably symmetric outer converging flow streams or nozzles are formed which act to accelerate the flow. FIG. 6 shows a representative flow velocity distribution, generated from the embodiment of FIG. 10. The velocity in the center of the cross-section is largely reduced beneath the average value for the flow stream (Vavg), as a result of the deceleration within the central diffuser. By contrast, the velocity in the outer wings of the velocity distribution, i.e., at the downstream ends of the converging nozzles, is nominally twice the average value due to the acceleration occurring within the outer converging nozzles. The low center velocity substantially reduces the ignition stand-off distance of the flame front, essentially slowing the flow velocity sufficiently to allow for ignition of the solid fuel just downstream of the fuel nozzle outlet or tip. Additionally, the interaction between the high velocity outer streams and the low velocity central region creates shear layers that produce a pair of streamwise counter-rotating vortices downstream of the fuel nozzle outlet, as illustrated in FIG. 7. This pair of vortices acts to recirculate hot combustion product gases and partially burnt solid particles upstream into the ignition zone so as to reinforce the strength and stability of the flame front adjacent the fuel nozzle outlet. Throughout the remainder of this specification, it is assumed that the ratio of the nozzle widths (e.g., W2/W1, W4/W3, W1/WN, see Table 1 and FIGS. 9, 18) is equal to the ratio of nozzle flow areas spanning those widths.

Figure 8:
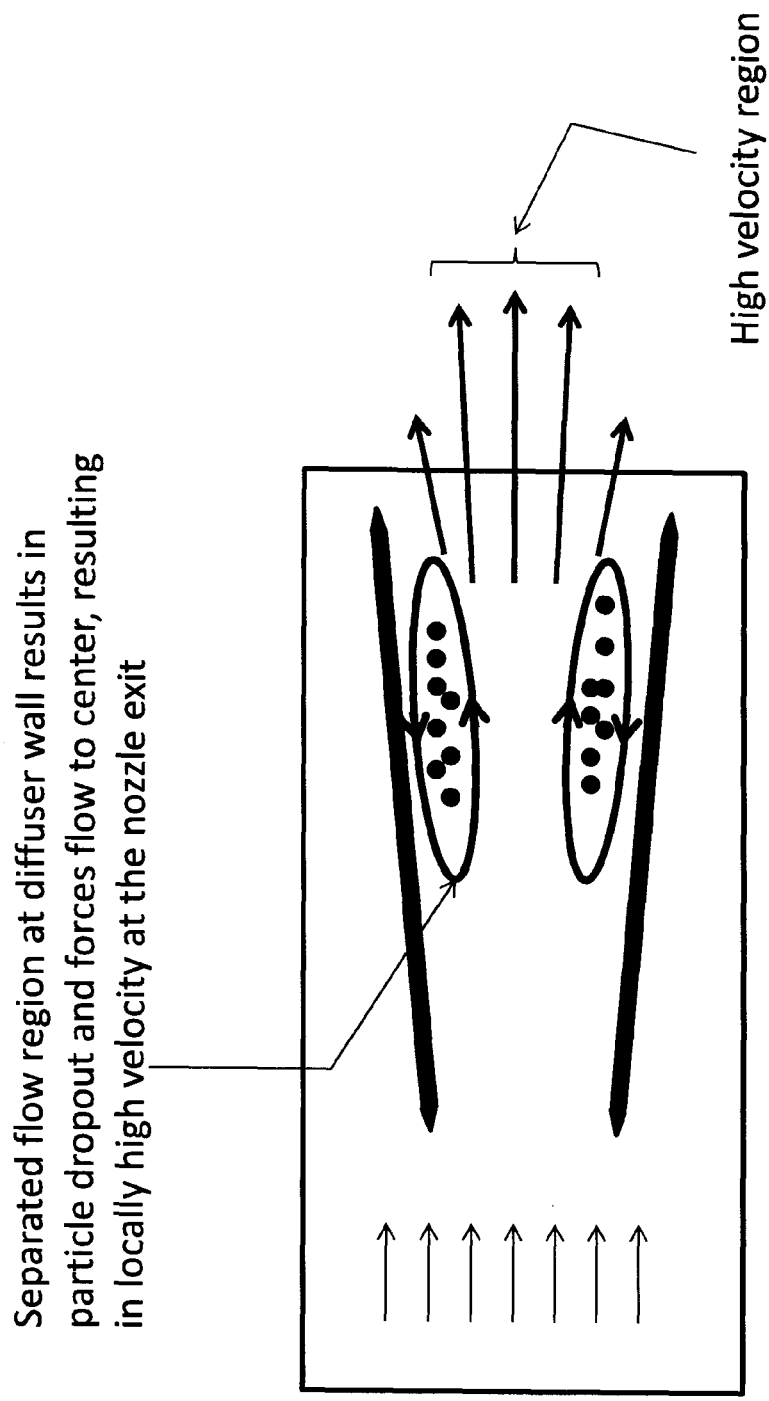
FIG. 8 is a schematic side cross-sectional view illustrating the negative effects of a diffuser geometric that causes separation, resulting in undesirable particle dropout and recirculation zones within the diffuser, as well as a region of undesirable local higher velocity in the center of the diffuser.
Figure 9:
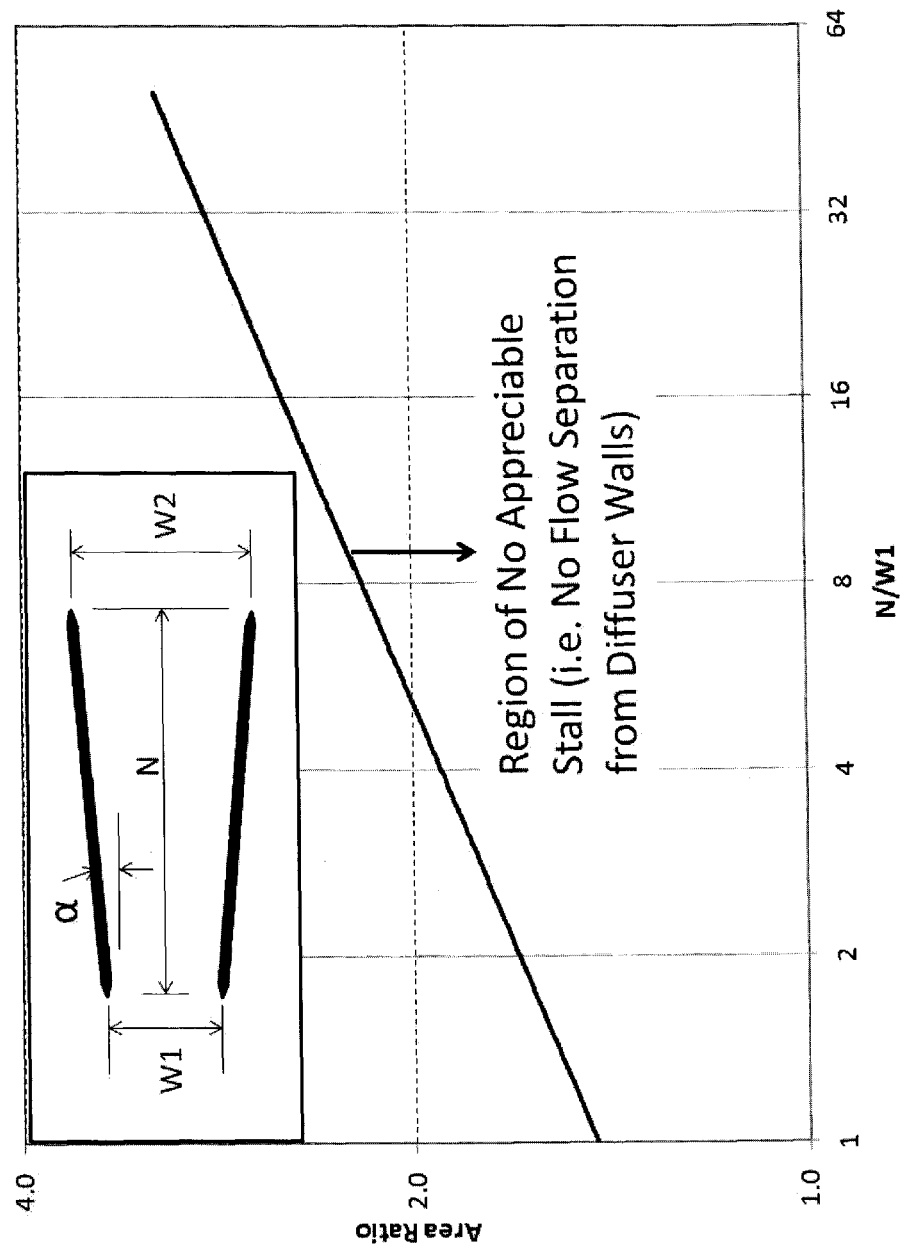
FIG. 9 is a logarithmic graph showing the desirable operating range of a diffuser with substantially no flow separation at the walls, expressed as relationship between N/W1 (length divided by inlet width) and W2/W1 (area ratio of outlet width to inlet width) of the diffuser.

The central diffuser is most effective if it is configured to have a "non-separating" design. That is, the diffuser geometry should be set to ensure that minimal flow separation occurs within the diffuser passage. Substantially preventing flow separation within the central diffuser minimizes the occurrence of stagnant regions of the flow in which there is zero velocity or reverse flow, as depicted in FIG. 8. Such stagnant flow would produce two deleterious effects: (1) dropout of solid fuel particulate within the diffuser passage, and (2) generation of a high velocity flow region within the center of the diffuser passage, negating the aforementioned beneficial effects of low velocity exiting the diffuser. Guidelines for attaining a non-separating diffuser passage, as known in the art, are shown in FIG. 9, which is a logarithmic graph of diffuser area ratio (W2/W1) versus non-dimensionalized length (N/W1).

Figure 10:
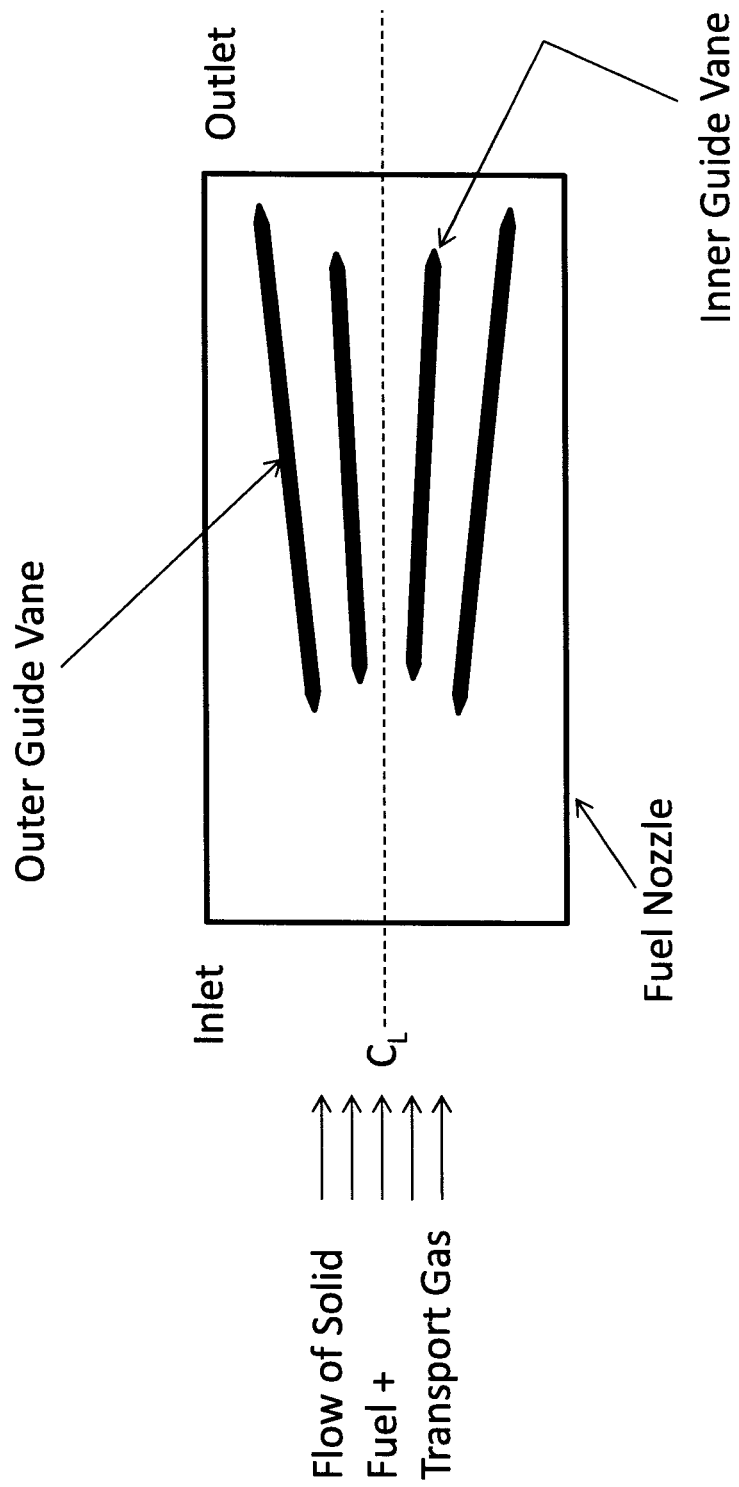
FIG. 10 is a schematic side cross-sectional view of an exemplary fuel nozzle including a pair of diverging guide vanes as in FIG. 4 (outer guide vanes), and further including a pair of inner diverging guide vanes positioned closer to the fuel nozzle centerline than the outer guide vanes.

From the point of view of flame stability, it is desirable to obtain the greatest degree of flow velocity reduction within the central diffuser without causing flow separation. This can be achieved by the use of one or more additional (second or inner) guide vanes positioned within the center diffuser section, i.e., the second guide vanes are positioned closer to the major axis centerline of the fuel nozzle than the first guide vanes, and diverge at a shallower angle. An embodiment utilizing two additional inner guide vanes is illustrated in FIG. 10. Note that these inner guide vanes effectively create additional parallel diffusing sections with greater non-dimensionalized length (N/W1) relative to the outer vanes. Hence, the use of internal guide vanes can enable a larger overall outlet to inlet area ratio (W2/W1) and, correspondingly, a lower outlet to inlet velocity ratio, to be attained without flow separation compared with that obtained using the outer guide vanes alone.

There are several geometric parameters than may be varied in the configuration of the diffuser-converging nozzle combination. Allowable and preferred ranges for some of these geometric parameters have been determined, while others may have less impact on the overall operation of the burner. In general, if the overall outlet-to-inlet area ratio of the diffuser (W2/W1) is too small, the average diffuser outlet velocity will be too high and consequently, stable attachment of the flame cannot be readily achieved. However, too large a diffuser area ratio (W2/W1) may lead to flow separation within the diffuser, with the consequences previously explained with reference to FIG. 8.

Moreover, assuming a constant total cross-sectional area of the fuel nozzle, the outlet-to-inlet area ratios of the central diffuser and converging nozzles are inversely related. Thus, as the area ratio of the diffuser (W2/W1) is decreased, the area ratio of the converging nozzles (W4/W3) increases, eventually leading to a situation in which the diffuser outlet velocity is too high for flame attachment, while the converging nozzle outlet velocity is too low to generate a sufficiently strong pair of counter-rotating vortices needed to stabilize combustion. Conversely, as the diffuser area ratio (W2/W1) is increased, the converging nozzle area ratio (W4/W3) decreases, which may result in extremely high outer nozzle velocities which can lead to breakdown of the coherent flame structure or, as the converging nozzle outlet area becomes small enough, to a substantial throttling and reduction of the outer nozzle flow. Both of these scenarios are deleterious toward flame stability in the solid fuel/oxygen burner. Diffuser and converging nozzle inlet and outlet widths are denoted in FIG. 18. Note that in the general, asymmetric case, the fuel nozzle inlet and outlet areas can be different in magnitude on either side of the fuel passage centerline. Hence, they are denoted as W3-L, W3-R, W4-L and W4-R. In the symmetric case, which is assumed in the preceding discussion, W3-L=W3-R=W3, and W4-L=W4-R=W4. Extending the preceding discussion to the asymmetric case requires replacing the ratio (W4/W3) with (W4-L/W3-L) and (W4-R/W3-R).

The ratio of the diffuser inlet area to the total fuel nozzle cross-sectional area (W1/WN) may also have significant impact on the operation of the burner. From the standpoint of flame stability, it is desirable to maximize the diffuser inlet area, since this leads to maximal fuel flow into the diffuser and, thus, maximal chemical energy release within the low velocity region of the flame. However, for a fixed diffuser angle α, as shown in FIG. 9 (wherein $\tan(\alpha)=(W2-W1)/(2N)$), too large of a diffuser inlet area (i.e., W1/WN too large) results in too small of a converging nozzle outlet area (i.e., W4/WN too small), with the negative consequences described in the preceding paragraph. By contrast, too small a diffuser inlet area (i.e., W1/WN too small) can starve the diffuser of the chemical energy needed to form a stable flame.

Therefore, allowable and preferred ranges of the various parameters discussed above for the geometry of the diffuser-converging nozzle combination are summarized in Table 1 below.

TABLE 1

| Parameter | Allowable Range | Preferred Range |
| --- | --- | --- |
| Ratio of Diffuser Inlet Area to Fuel Nozzle Area (W1/WN) | 0.15-0.60 | 0.20-0.40 |
| Ratio of Diffuser Outlet Area to Diffuser Inlet Area (W2/W1) | 1.3-4.0 | 1.7-3.0 |
| Ratio of Converging Nozzle Outlet Area to Converging Nozzle Inlet Area (W4/W3) | 0.15-0.75 | 0.25-0.60 |

The practical bounds placed on the ratio of diffuser inlet area to the total fuel nozzle area (W1/WN), as summarized in Table 1, effectively limits the mass fraction of the incoming fuel stream that enters the diffuser. Moreover, assuming homogenous flow velocity and solid fuel concentration in the fuel nozzle approaching the diffuser inlet, the fuel-to-transport gas mass ratio entering the diffuser is equal to the average stream value. However, for ease of ignition and strength of stability, it is desirable to increase both the fuel mass fraction and fuel to transport gas mass ratio beyond that normally attainable within these limits. As discussed above, higher fractions of fuel entering the diffuser leads to greater chemical energy release at the low velocity outlet stream of the diffuser, which enhances flame stability. And higher values of the fuel-to-transport gas mass ratio result in a lower dilution effect of the transport gas, leading to a more rapid heat up of fuel particles, and a reduction in the ignition delay and greater flame stability.

The fuel-to-transport gas mass ratio can be increased beyond the value implied by the geometric diffuser limits by concentrating the fuel entering the diffuser above its homogenous concentration. This is accomplished in one embodiment by the strategic placement of one or more flow segregators (static flow devices) upstream of the outer guide vanes. Essentially, the flow segregators either divert more fuel into the diffuser, more transport gas into the converging outer nozzles, or both in combination. An exemplary style and placement of flow segregator which satisfies these objectives is illustrated in FIG. 11, understanding that there are virtually limitless configurations, orientations, and positions of flow segregators that can accomplish the desired objectives, sometimes to greater or less degrees.

Two flow segregators are depicted in the embodiment of FIG. 11. The flow segregators are mirror images of one another, and their layout is symmetric with respect to the major axis centerline of the fuel flow passage. The design of the flow segregators shown in this figure comprises two asymmetric sides diverging in the downstream direction from an apex: a first or inner side having a combination of a straight edge followed by a curved rear edge, and a second or outer side having a single straight edge, wherein the curved rear edge joins to the second side at the downstream end. To achieve the objective of increasing the fuel concentration within the diffuser, the physical layout of the flow segregators should preferably fits the geometric parameters denoted in FIG. 12. Specifically, the distance between the leading edge or apex of the flow segregator and the centerline of the passage, Xm, should be greater than the distance between the upstream or leading edge of the outer guide vane and the passage centerline, Xv. Note that Xv is equal to half of W1 when the guide vanes are symmetrically positioned about the major axis centerline.

Figure 12:
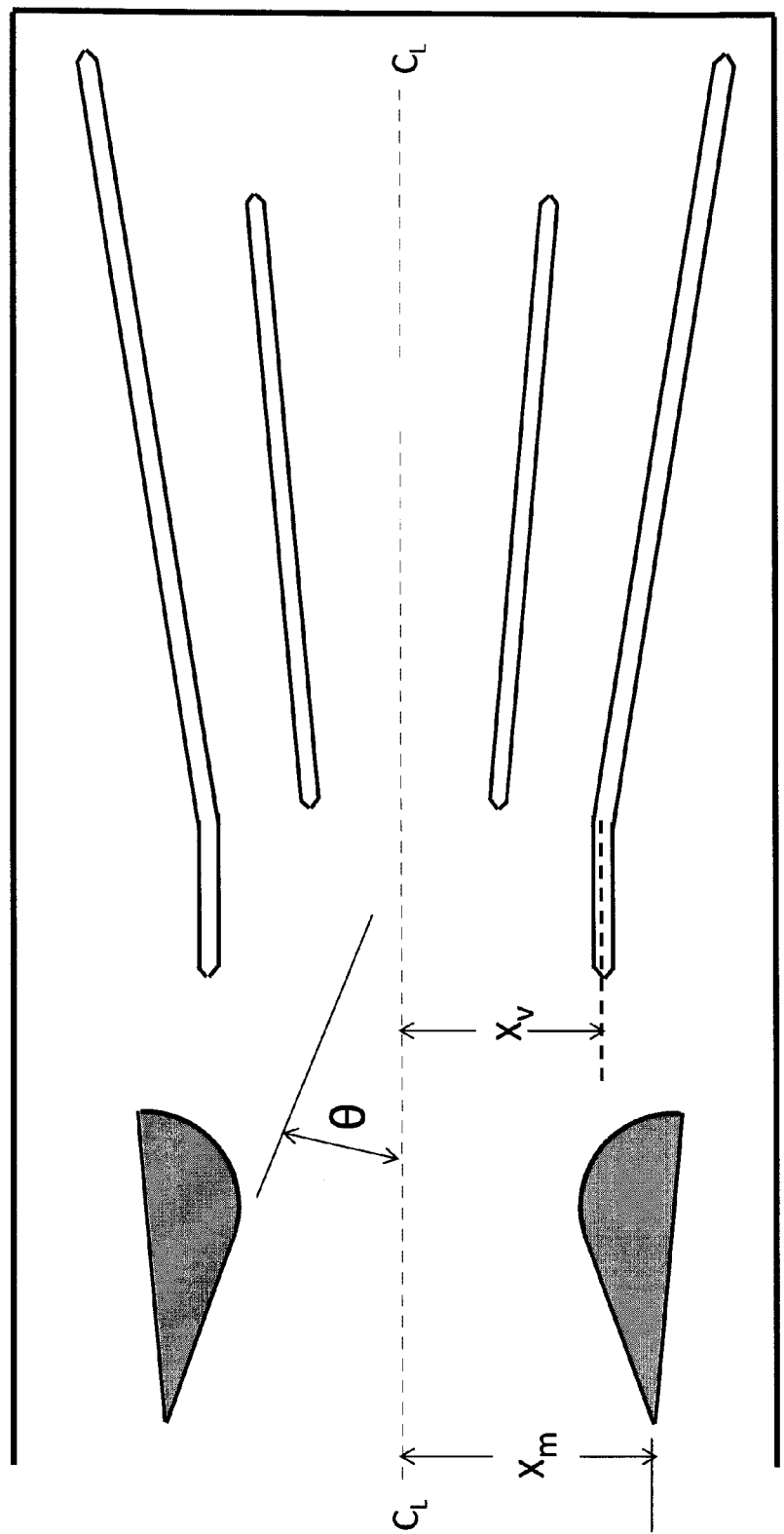
FIG. 12 is schematic cross-sectional view of an exemplary fuel nozzle as in FIG. 11, illustrating geometric parameters relevant to the relative positioning of the flow segregators and the outer guide vanes.
Figure 13:
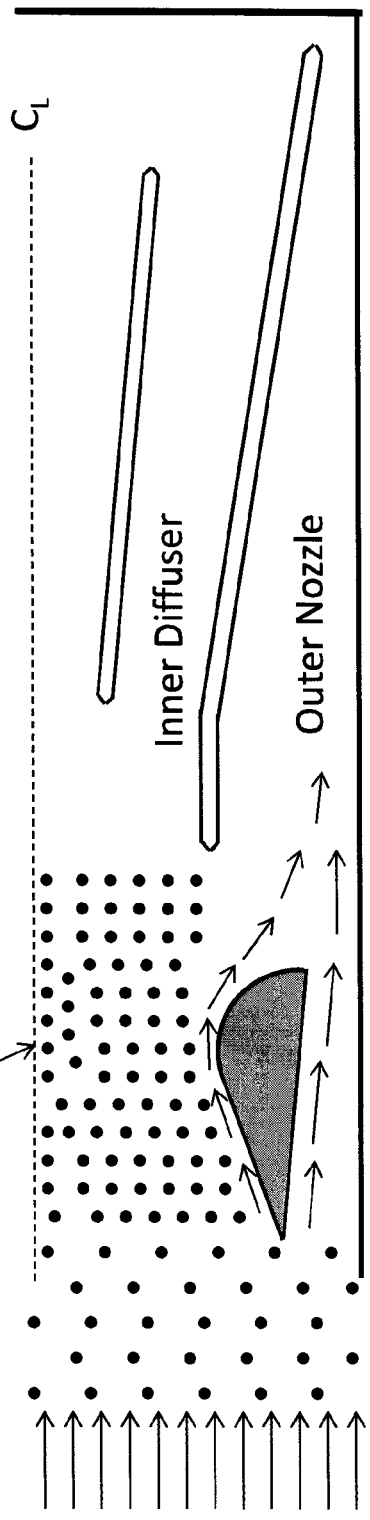
FIG. 13 is a schematic cross-sectional view of one half of a symmetric exemplary fuel nozzle as in FIG. 11, showing the effect of the flow segregator on fuel particle distribution entering the diffuser formed by the outer guide vanes; in general, the flow segregator causes a fuel flow having higher concentration of solid fuel particles to be directed into the diffuser, while a fuel flow having a lower concentration of solid fuel particles is directed to the outer converging nozzle.

When the flow segregator is positioned with Xm>Xv, the flow segregator functions to augment the proportion of the fuel nozzle cross-sectional area that feeds the center diffuser, i.e., the flow segregators direct flow from an area greater than W1 toward the inlet of the central diffuser having a width W1. To accomplish this, the inner (first) side of the flow segregator should have an initial trajectory toward the centerline of the fuel nozzle. That is, as shown in FIG. 12, the angle θ has a value of between 0° and 90°, and preferably between about 15° and about 45°. This gives the fuel particles a momentum (vector) directed within the inlet to the central diffuser, thereby increasing the amount of fuel particles flowing through the diffuser relative to what would occur in the absence of a flow segregator. Regarding the transport gas flow, while the momentum of the solid fuel particles is strongly influenced by its initial trajectory on the inner side of the flow segregator, the transport gas flow tends to remain attached to the downstream curved rear surface of the inner (first) side. So, the transport gas flowing along the inner side of the flow segregator will have more of a tendency to flow back around the curved surface and meet the outer side at the downstream edge, as illustrated qualitatively in the flow field shown in FIG. 13. Hence, while the solid fuel particles tend to concentrate in the diffuser due to the action of the inner side of the flow segregator and the inability of the solid fuel particles to quickly shift momentum to follow the transport gas streamlines around the flow segregator, the transport gas distribution across the fuel nozzle will remain largely unaffected, thus accomplishing the sought-after increase in diffuser fuel concentration (and resultant decrease in converging nozzle fuel concentration).

Figure 14:
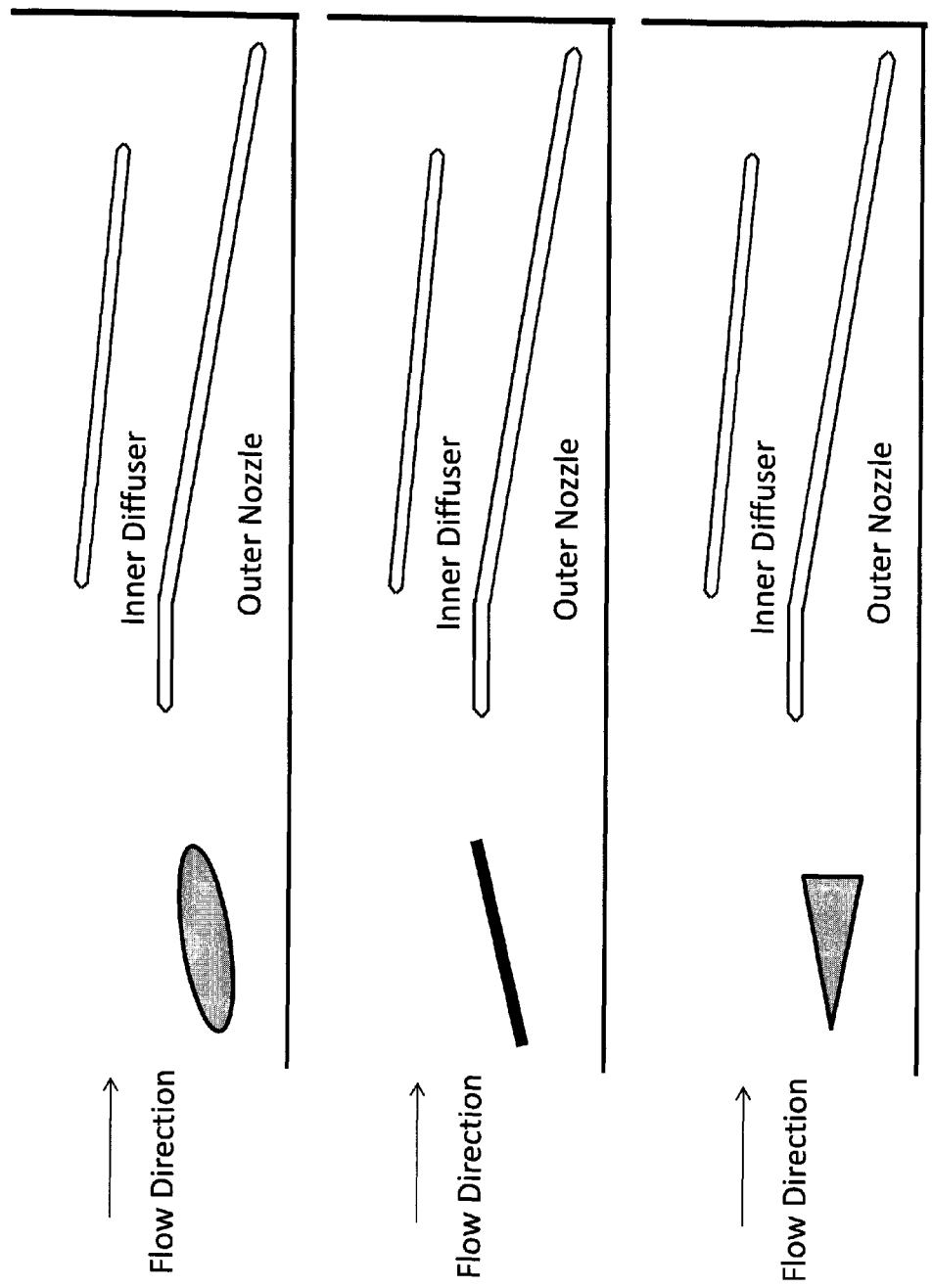
FIG. 14 is a set of schematic cross-sectional views of one half of a symmetric exemplary fuel nozzle as in FIG. 12, showing three possible non-limiting examples of shapes for a flow segregator positioned upstream of the outer guide vanes.

Numerous other designs and layouts of flow segregators can be employed in the inventive burner to accomplish a concentrating of the fuel stream within the diffuser. These include, but are not limited to, thin straight vanes, triangles and ellipsoids as depicted in FIG. 14.

Figure 15:
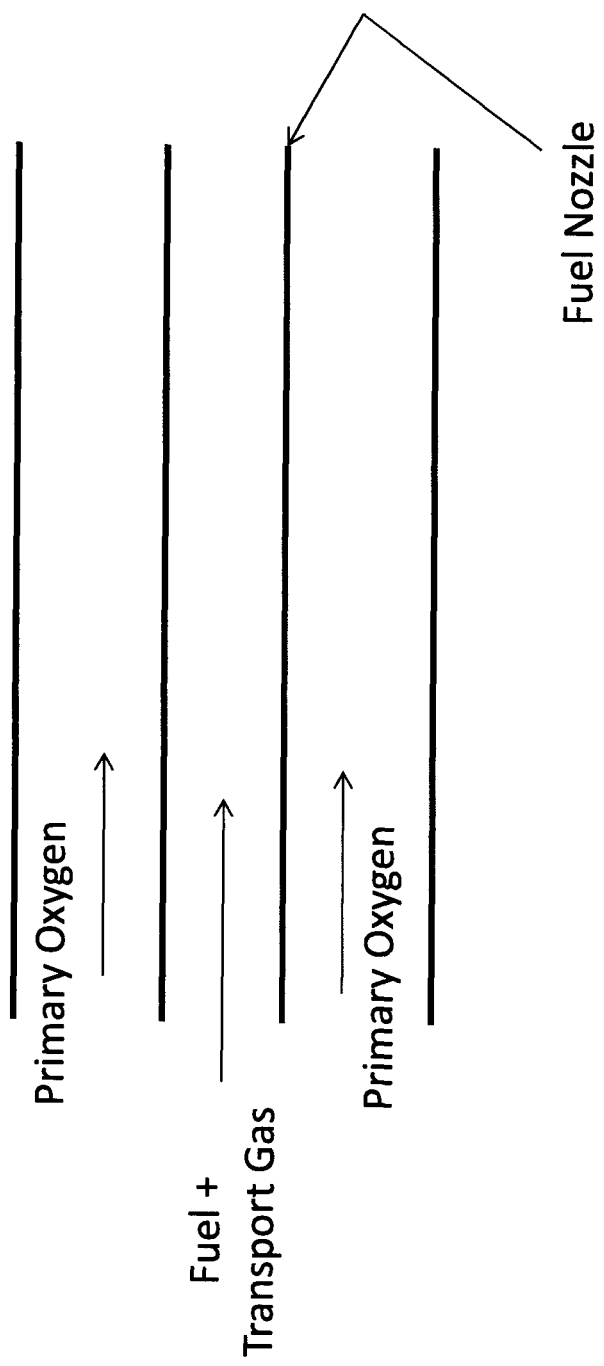
FIG. 15 is a schematic side cross-sectional view of a burner having a fuel nozzle bounded on each of the long (major axis) sides by a primary oxygen nozzle.
Figure 16:
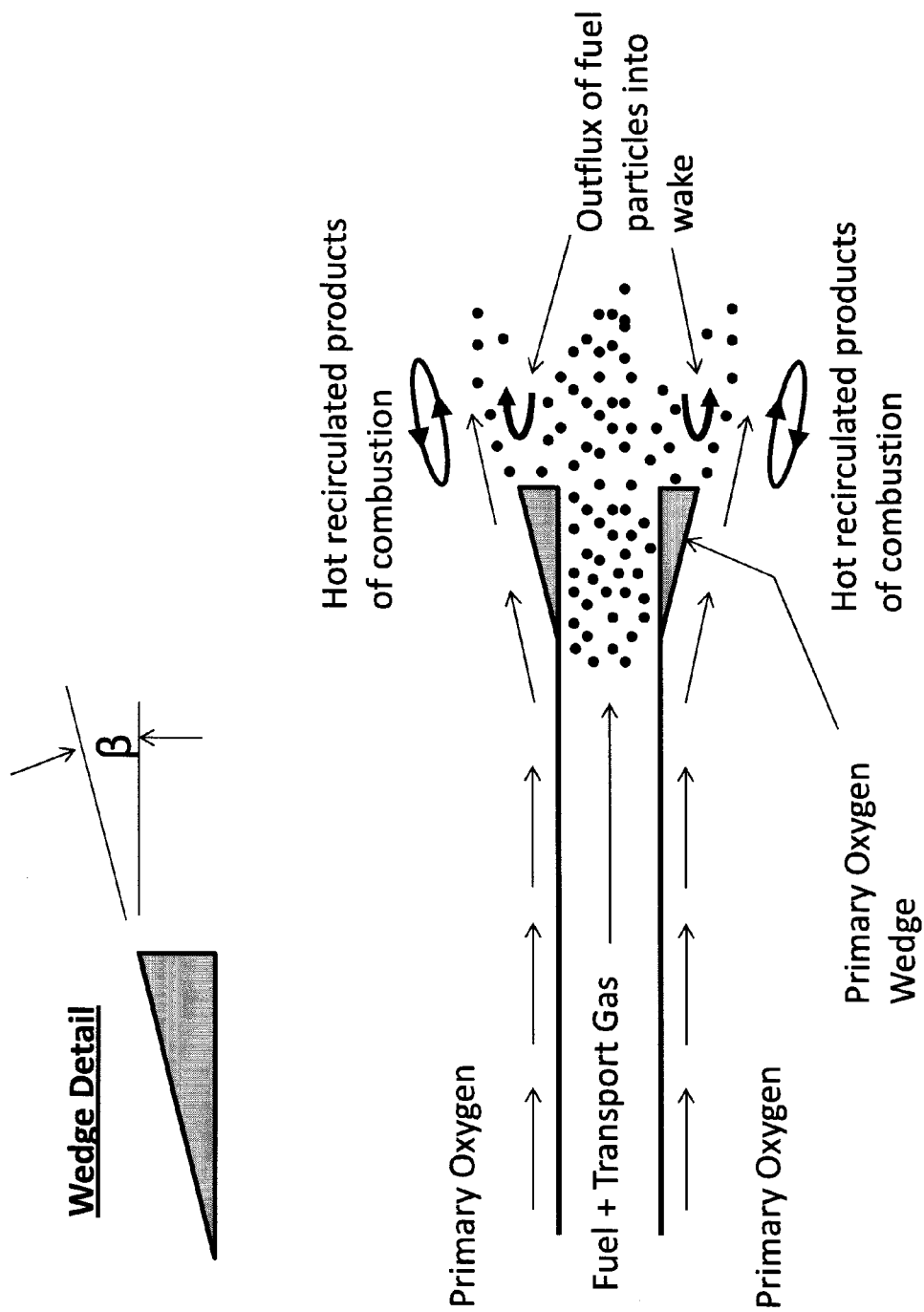
FIG. 16 is a schematic side cross-sectional view of a burner as in FIG. 15 in which a generally triangular wedge having an angle β protrudes into each primary oxygen flow path from the fuel conduit separating the fuel stream from each primary oxygen stream, and illustrating the resultant flow patterns at the burner face including a divergent flow of oxygen which causes recirculation of hot combustion products and an outflux of fuel particles from the fuel stream into the wake of the divergent oxygen stream exiting the burner.

Performance of the present burner can be further enhanced by adjusting the interaction between a primary oxygen stream positioned adjacent to each of the long sides of the fuel nozzle and the fuel/transport gas stream at the fuel nozzle outlet or tip. Primary oxygen flows in the primary oxygen conduit, the axis of which is nominally parallel to the major axis centerline of the fuel/transport gas conduit, as shown in FIG. 15. However, parallel flow of the oxygen and fuel/transport gas at the point of mixing between fuel and primary oxygen streams (fuel nozzle tip or outlet) may be deleterious to flame attachment because the shearing of the fuel stream by the primary oxygen stream tends to pull the ignition point away from the fuel nozzle tip. To avoid this destabilizing effect, a deflecting wedge is incorporated to protrude into the primary oxygen stream from the wall separating the fuel nozzle from the primary oxygen conduit, in order to create non-parallel, divergent flow at the fuel nozzle tip. The wedge is defined principally by the wedge angle, β, which is from about 3° to about 30° degrees, and is preferably from about 5° to about 15°. The flow pattern generated by the wedge is illustrated in FIG. 16. A low pressure, low velocity wake region is formed adjacent to the wedge on the downstream side. On one side of the wake an in-flux of fuel particles is induced that mixes intimately with the primary oxygen at low velocity, while hot recirculated products of combustion are drawn in on the other side of the wake, heating both the primary oxygen and the fuel particles. These flow effects thus work cooperatively to enhance early ignition and flame stability in the inventive burner.

Figure 17:
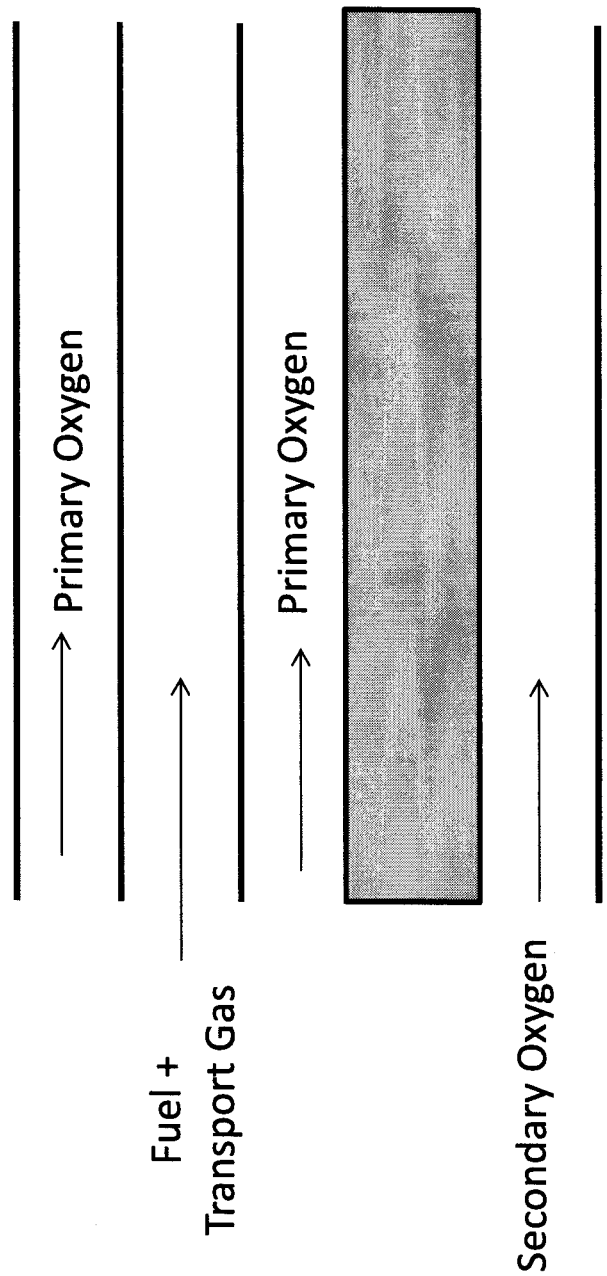
FIG. 17 is a schematic side cross-sectional view of a burner as in FIG. 15 or FIG. 16 further including a secondary staging oxygen stream spaced apart from one of the primary oxygen streams and further distant from the fuel stream from the one of the primary oxygen streams.

The burner may also incorporate a secondary oxygen stream introduced adjacent to, but separated from, the primary oxygen and fuel streams, to accomplish staged combustion in which a substoichiometric amount of primary oxygen is provided and the remaining necessary oxygen for complete combustion is provided by the secondary oxygen stream. One particularly advantageous orientation of secondary oxygen introduction is beneath the fuel nozzle as illustrated in FIG. 17. Such an orientation allows for delayed introduction of secondary oxygen with the primary oxygen/fuel flame, thus lengthening the flame, lowering peak flame temperature and reducing NOx emissions. Moreover, mixing of the underside of the flame with secondary oxygen creates a preferentially downward direction for flame radiation which is known to have beneficial effects for heating and melting furnaces where the burner is positioned above raw feedstock.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A wide-flame solid fuel/oxygen burner comprising:
 a fuel nozzle having an upstream-to-downstream flow direction, an aspect ratio of at least about 2 defined by the ratio of a fuel nozzle width, W, measured along a major axis centerline, to a fuel nozzle height, H, measured along a minor axis centerline, and long walls spaced substantially symmetrically from the major axis centerline, the fuel nozzle having an inlet width, WN; and
 a pair of first guide vanes positioned on either side of the major axis centerline of the fuel nozzle, each first guide vane being positioned between the major axis centerline and an adjacent one of the long walls, the first guide vanes diverging from the major axis centerline in the flow direction by a first angle such that the first guide vanes are closer together at an upstream end and farther apart at a downstream end, thereby forming a central diffuser between the first guide vanes and an outer converging nozzle between each first guide vane and one of the long walls, wherein the first guide vanes are positioned substantially symmetrically with respect to the major axis centerline, wherein two second guide vanes are positioned substantially symmetrically on either side of the major axis centerline of the fuel nozzle, the second guide vanes diverging from the major axis centerline by a second angle less than the first angle, thereby forming a primary central diffuser between the second guide vanes and a secondary central diffuser between each second guide vane and one of the first guide vanes.

2. The burner of claim 1, wherein each of the first guide vanes further includes a leading edge oriented substantially parallel to the major centerline axis of the fuel nozzle.

3. The burner of claim 1, wherein each central diffuser has a geometry configured to produce a non-separating flow.

4. The burner of claim 1, wherein the upstream ends of the first guide vanes are spaced apart by a distance, W1, from about 0.15 to about 0.60 times the fuel nozzle inlet width, WN.

5. The burner of claim 1, wherein the downstream ends of the first guide vanes are spaced apart by a distance, W2, from about 1.3 to about 4.0 times the distance between the upstream ends of the first guide vanes, W1.

6. The burner of claim 1, wherein the downstream end of each one of the first guide vanes and the adjacent one of the long walls with which an outer converging nozzle is formed are spaced apart by a distance, W4, from about 0.15 to about 0.75 times a distance between the upstream end of the one of the first guide vanes and the one long wall, W3.

7. The burner of claim 1, further comprising:
 a primary oxygen conduit adjacent to each of the long walls of the fuel nozzle; and
 a wedge protruding from each of the long walls into the oxygen conduit at a downstream end of the fuel nozzle, the wedge being positioned to cause primary oxygen flow to diverge outwardly from the major axis centerline of the fuel nozzle.

8. The burner of claim 7, further comprising a secondary oxygen conduit spaced apart from one of the primary oxygen conduits and further distance from the fuel stream than the one of the primary oxygen conduits.

9. A method of combusting a pulverized solid fuel with oxygen to form a wide flame in the wide-flame solid fuel/oxygen burner of claim 1, the method comprising:
 flowing a fuel stream of pulverized solid fuel in a transport gas through a fuel nozzle;
 dividing the fuel stream into at least three separate streams including a central stream flowing in a diffuser formed between a pair of first diverging guide vanes and a pair of outer streams each flowing in a converging nozzle formed between one of the guide vanes and a wall of the fuel nozzle;
 wherein the central stream decelerates and the outer streams accelerate.

10. The method of claim 9, further comprising:
 after the central stream flows into the diffuser, further dividing the central stream into multiple separate diffusing streams formed by one or more second guide vanes positioned between the pair of first diverging guide vanes.

11. The method of claim 9, further comprising:
 flowing primary oxygen adjacent to each of the long walls of the fuel nozzle; and
 flowing the primary oxygen over a wedge protruding from each of the long walls at a downstream end of the fuel nozzle to cause primary oxygen flow to diverge outwardly from the major axis centerline of the fuel nozzle.

12. The method of claim 11, further comprising:
 flowing secondary oxygen spaced apart from the flow of primary oxygen on one side of the fuel nozzle.

* * * * *